Patented Apr. 17, 1934

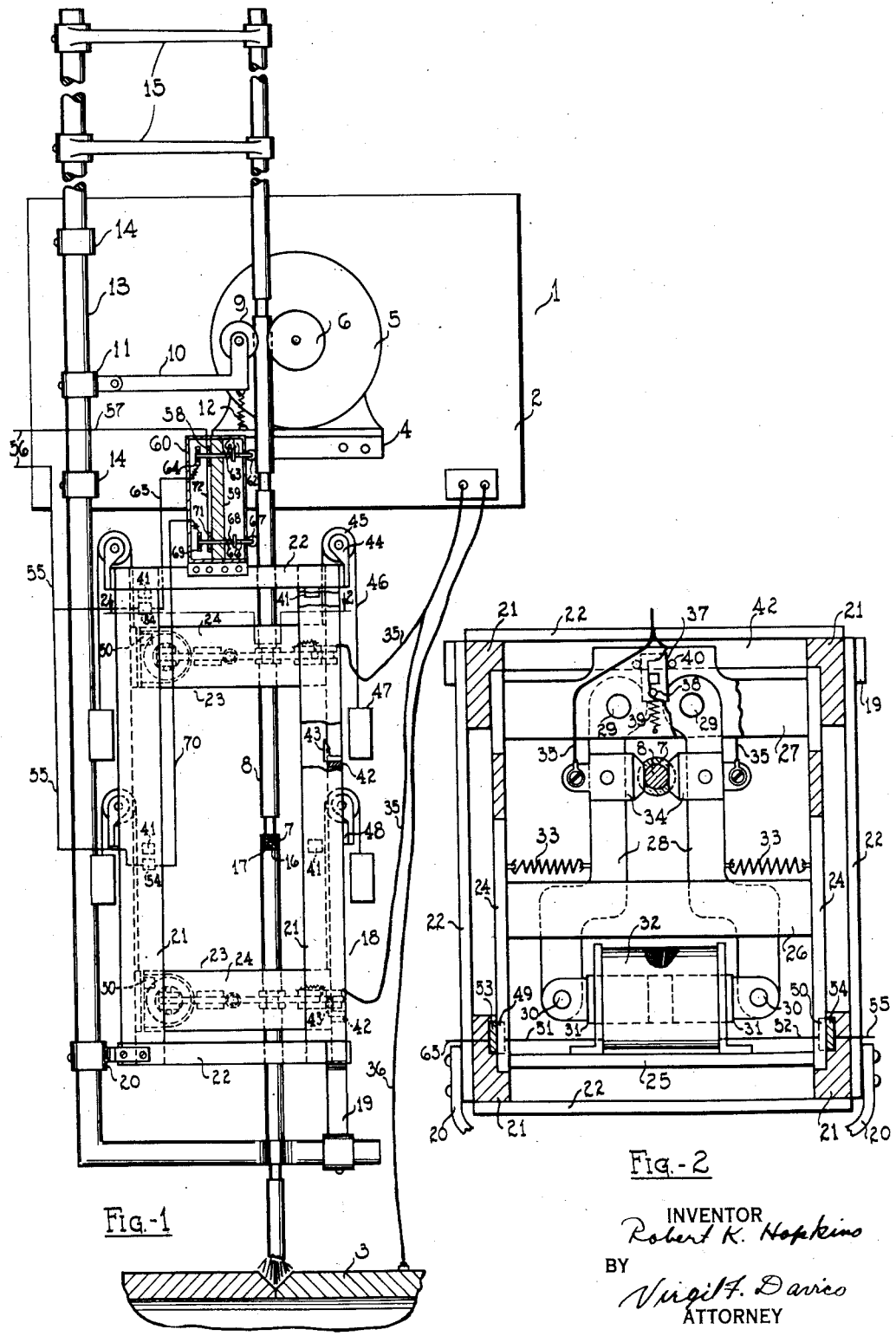

1,955,000

UNITED STATES PATENT OFFICE 1,955,000

ELECTRIC ARC WELDING APPARATUS

Robert K. Hopkins, New York, N. Y., assignor to M. W. Kellogg Co., New York, N. Y., a corporation of Delaware Application May 25, 1933, Serial No. 672,753

16 Claims. (Cl. 219—8)

This invention relates to electric arc welding apparatus and particularly to electric arc welding apparatus of the character adapted to employ welding electrodes, which include a covering of non-conducting material, and with such electrodes carry on the welding as a continuous operation.

In order to employ the welding electrodes of the character mentioned with the automatic welding heads now commercially available and successfully weld for indefinite periods without interrupting the arc, it is necessary that the welding electrodes be such that welding current can be continuously passed to the core thereof, and, in the case of rod electrodes as distinguished from wire electrodes the welding electrodes must also be such that they can be made continuous. It is also necessary that the welding machines include some device for continuously passing the welding current to the cores of the welding electrodes as they pass to the arc. When the function the current passing devices must perform and the conditions under which they perform it are considered, it should be apparent that such devices must be of a simple and rugged construction, must not include any delicate or complicated mechanism which required constant attention and adjustment, must be positive acting and must be such to continuously pass the current to the welding electrode core without appreciable sparking or arcing.

I have found that a fully satisfactory welding electrode may be produced by removing small portions of the non-conducting covering at spaced intervals so as to expose small sections of the core through which the welding current may be passed. In the case of welding electrodes of the rod type the electrodes are made up in sections of convenient length and the sections are provided with means which allow them to be easily joined one to the other.

It is an object of this invention to provide a positive acting device for continuously passing the welding current to the core of a welding electrode, such as just mentioned, which is of simple and rugged construction, does not include any delicate or complicated mechanism and makes and breaks contact with the exposed areas passing therethrough with a minimum of sparking and arcing.

It is a further object of this invention to provide a device for continuously passing the welding current to the core of a welding electrode, such as above mentioned, which includes a plurality of current carrying members each of which is reciprocatable between spaced points in the path of the electrode and is adapted to engage and move with the exposed sections of the electrode as the exposed sections pass through its path of movement, the length and the spacing of the paths of movement of the reciprocatable members being such that at least one of the reciprocatable members is at all times in engagement with an exposed area of the electrode.

It is also an object of this invention to provide a device for continuously passing the welding current to a welding electrode, such as above mentioned, which includes a plurality of carriages that are reciprocatable between points in the path of the welding electrode each of which supports current carrying members actuatable to engage the exposed areas of the welding electrode to pass current thereto and to move the carriage with the electrode, the actuatable members of each carriage being actuated by electrical means the circuit of which is closed, when an exposed area of the welding electrode registers with the top position of the actuatable members, by a means which constantly bears on the welding electrode.

The other objects and advantages of the invention will be readily appreciated from a consideration of the following description of a preferred embodiment thereof taken with the accompanying drawing, in which, Fig. 1 is a front elevation of an automatic electric arc welding machine to which the novel device for continuously passing the welding current to the core of covered electrode has been applied, and Fig. 2 is a sectional view taken on line 2—2 of Fig. 1.

Referring to the drawing:

Automatic arc welding machine 1 includes a panel 2 from which the various elements of machine 1 are supported. Panel 2 is carried by supports (not shown) so as to be either fixed or movable relative to work 3. The welding current generating means, the arrangements for controlling the feeding of the welding electrode, the welding electrode oscillating motor, etc., which usually form part of automatic arc welding machines have not been shown as they per se form no part of this invention and for the purposes of this description will be considered as located in the rear of panel 2. The various switches, meters, etc., have also not been shown for the reason just stated and will be considered as located on the front side of panel 2.

To the front of panel 2 is fastened a bracket 4 upon which is mounted welding electrode feeding motor 5. To the shaft of motor 5 is fastened welding electrode feeding wheel 6 whose periphery is made of rubber, or similar material, so as not to injure the non-conducting coating 7 of welding electrode 8. On the other side of welding electrode 8 is a wheel 9, similar to wheel 6, which bears on welding electrode 8 and prevents slippage between welding electrode 8 and wheel 6. Wheel 9 is journalled in a support 10 which is pivoted in member 11. A spring 12, having one end fastened to bracket 4 and the other end fastened to support 10, constantly urges wheel 9 into contact with electrode 8. Member 11 is carried by a guide bar 13 which is fastened to brackets 14 secured to panel 2. Guide bar 13 carries welding electrode guides 15 at its upper end and has its lower end bent and perforated to guide the lower end of welding electrode 8 to work 3.

In order that the welding may be carried on continuously without interruptions due to replacement of consumed welding electrodes, welding electrode 8 is made up of a plurality of similar easily connectible sections so that by adding sections as required the welding may be carried on indefinitely. Each section of welding electrode 8 is made up of a metallic core 16 and a non-conducting covering 7 of ceramic, or similar material. The ends of core 16 are formed into parts of a joint forming means, as for instance the screw joint 17. Non-conducting covering 7 is removed at regularly spaced intervals along the length of the sections to expose small sections of core 16 through which the welding current may be passed.

A device 18, for passing the welding current to the exposed sections of welding electrode 8 as the exposed sections of welding electrode 8 pass to the arc, is supported from guide bar 13 by members 19 and 20. Device 18 includes four vertical members 21 which are connected at their ends to horizontal members 22 to form a frame. Members 21 have their sides cut away to provide guideways in which are adapted to move carriages 23, two being provided. Each of carriages 23 includes side plates 24 which are connected by an end plate 25 and pairs of cross members 26 and 27. Cross members 26 as well as cross members 27 are separated from each other to accommodate between them levers 28. Each of levers 28 has one end pivoted on a pin 29 which is fastened to cross members 27 and the other end pivoted on a pin 30 which is carried by short core member 31. Short core members 31 fit in the core of solenoid 32 which is carried by end plate 25 and are adapted to move towards each other when solenoid 32 is energized. To each of levers 28 and between the ends thereof is anchored a spring 33 whose other end is anchored to one of side plates 24. Springs 23 normally urge levers 28 away from each other. Each of levers 28 carries insulated therefrom a contact member 34 which is connected through cable 35 to one side of the welding current generator. The other side of the welding current generator is connected through cable 36 to work 3.

Portions of the ends of levers 28 which are pivoted on pins 29 are cut away to form notches, the notches being so located that when levers 28 are in the position of Fig. 2 lock-piece 37 can move into the space defined by them to lock levers 28 in position and prevent springs 33 from separating them. Lock-piece 37 is rectangular in shape and also fits between cross members 27. A rectangular hole is cut in lock-piece 37, for a purpose hereinafter explained, cross-pieces 27 having similar holes cut in them but of a length equal to that of the hole in lock-piece 37 plus the distance of movement of lock-piece 37 in moving out of the notches in levers 28 to the unlock position. Lock-piece 37 carries a pin 38 to which is anchored one end of spring 39. The other end of spring 39 is anchored to the top cross member 27. Spring 39 serves to constantly urge lock-piece 37 to the position shown in Fig. 2. A suitable slot is provided in the top cross member 27 to allow movement of pin 38. If desired a pin similar to pin 38 and a spring similar to spring 39 may be provided on the other side of lock-piece 37. Pins 40 are fastened to cross members 27 and serve to guide lock-piece 37 in its movements.

Adjacent the top and intermediate the ends of each vertical member 21 are fastened stop pieces 41 which serve to limit the upward movement of carriages 23. Between the sets of stop pieces 41 and at a distance below the top set of stop pieces 41, is positioned a bar 42 which has fixed to its middle a wedge member 43. Wedge member 43 is adapted to enter the hole in lock-piece 37 to move lock-piece 37 out of the space between the notches in levers 28 to allow springs 33 to separate levers 28 when the top carriage 23 has reached the predetermined end of its downward movement. A bar 42 and wedge member 43 is also located at a predetermined distance below the bottom set of stop pieces 41.

Brackets 44 are fastened to each end of the top horizontal members 22 that run transverse to panel 2. In brackets 44 are supported wheels 45 over which pass flexible cables 46. Each of cables 46 has one end fastened to a corner of the top carriage 23 and has a counterweight 47 fastened to its other end so that when top carriage 23 is out of engagement with welding electrode 8 cables 46 and counterweights 47 will carry top carriage 23 upwards until the tops of the side plates 24 abut stop pieces 41. Cross members 48, similar to horizontal members 22, are fastened intermediate the ends of vertical members 21 and somewhat above the bottom set of stop pieces 41. At each end of cross members 48 are also fastened brackets 44 which also support wheels 45. Over these wheels 45 pass cable 46, having counterweights 47 at their ends, which are connected to the corners of the bottom carriage 23 and serve to raise this carriage to the bottom set of stop pieces 41 when this carriage is out of engagement with welding electrode 8.

Adjacent the end which is connected to end plate 25, each side plate 24 of carriages 23 is recessed to accommodate a contact piece. In each of carriages 23 contact piece 49 is located in one recess and contact piece 50 in the other. Insulation is provided to electrically separate contact pieces 49 and 50 from carriage 23. Contact pieces 49 and 50 are made flush with the sides of side plates 24. Contact piece 49 of each carriage is connected to one side of the coil of solenoid 32 through conductor 51 and contact piece 50 is connected to the other side of solenoid 32 through conductor 52. The pair of vertical members 21 nearest guide bar 13 are also recessed to accommodate contact pieces 53 and 54 which are adapted to register with contact pieces 49 and 50 when carriages 23 are in their uppermost positions. Contact pieces 53 and 54 are insulated from vertical members 21. Each of contact pieces 53 and 54 is arranged to provide good contact between it and its one of contact pieces 49 and 50 when carriages 23 are in their uppermost positions. If desired springs or other resilient means may be employed to assure good contact.

Each contact piece 54 is connected to conductor 55 which forms one side of a current supply line 56. The other side of current supply line 56 is formed by conductor 57 and is connected to contact washer 58. Contact washer 58 is supported on the plate 59 that is housed in housing 60. Housing 60 is positional adjacent the path of welding electrode 8 on a member that is fastened to horizontal members 22. Contact washer 58 is insulated from plate 59 and surrounds a bore in which is adapted to move a rod 61 on one end of which is mounted roller 62. Rod 61 and roller 62 are constantly urged toward welding electrode 8 by a spring 63 carried by rod 61 and positioned between plate 59 and a washer fastened to rod 61. At its other end rod 61 carries insulated therefrom a contact washer 64 which is connected through conductor 65 to the top one of contact pieces 53.

Spaced below the bore which accommodates rod 61 is a second bore in which moves rod 66. At one end of rod 66 is mounted a roller 67 which together with rod 66 is constantly urged towards the path of welding electrode 8 by a spring 68 carried by rod 66 and positioned between plate 59 and a washer fastened to rod 66. At its other end rod 66 carries insulated therefrom a contact washer 69 which is connected through conductor 70 to the bottom one of contact pieces 53. A contact washer 71 supported on plate 59, surrounds the bore which accommodates rod 66 and is connected by conductor 72 to contact washer 58. Suitable insulation is interposed between contact washer 71 and plate 59. The distance between rollers 62 and 67 is preferably about one half the distance between the exposed sections of the core 16 of welding electrode 8.

To carry on the welding operation the circuit of motor 5 is closed and a section of welding electrode 8 passed through guides 15 to feeding wheel 6 which will feed it past housing 60 through device 18 to work 3. When the bottom of welding electrode 8 is separated from work 3 by a distance somewhat greater than the distance between exposed sections of core 16 the switch, not shown, in current supply line 56 and the switch, also not shown, in the welding current supply line, are closed. When the next exposed section of core 16 registers with roller 62 and roller 62 moves to contact with it, rod 61 will bring contact washers 58 and 64 together to close the circuit of solenoid 32 of the top carriage 23. At this time the top carriage 23 will be in its uppermost position and another exposed section of core 16 will be registering with contact members 34. Hence when the circuit of solenoid 32 is closed short core members 31 will be brought towards each other and contact members 34 made to grip the exposed section of electrode 8. The rotation of the pivoted ends of levers 28 at that time will cause the notches to separate and allow lock-piece 37 to move between them and lock levers 28 against movement. Top carriage 23 will now be connected through contact members 34 to welding electrode 8 and will move down with it.

When the exposed section of core 16 moves out of registry with roller 62, rod 61 moves back and opens the circuit of solenoid 32 of the top carriage 23 but since levers 28 are locked in position this will have no effect on levers 28. As the feed of welding electrode 8 continues and the exposed section of core 16 comes into registry with roller 67 roller 67 will move to contact with the exposed section of core 16 and rod 66 will bring contact washers 69 and 71 together to close circuit of solenoid 32 of the bottom carriage 23. Since at that time the bottom carriage 23 is in its uppermost position and an exposed section of core 16 is in registry with the pair of contact members 34 of the bottom carriage, the closing of levers 28 will cause contact members 34 to grip the exposed section of core 16 to engage the bottom carriage 23 with welding electrode 8. At this time both carriages 23 will move down with welding electrode 8. The extent of the concomitant movement is determined by the position of the top wedge 43. When wedge 43 enters the hole in lock-piece 37 and moves lock-piece 37 out of locking position springs 33 will separate levers 28 and release top carriage 23 from welding electrode 8. Top carriage 23 will then be brought back to its uppermost position by cables 46 and counter weights 47. The extent of the concomitant movement of carriages 23 is such that proper engagement of the bottom carriage is assured before the top carriage is released.

The bottom carriage 23 will continue its downward movement with welding electrode 8 alone until another exposed section of core 16 registers with roller 62 when, as before, top carriage 23 will engage an exposed section of core 16. Both carriages 23 will again move down with welding electrode 8 until the bottom carriage 23 is disengaged by bottom wedge 43. The distance between the bottom wedge 43 and bottom stop pieces 41 is the same as the distance between top wedge 43 and top stop pieces 41. After the bottom carriage 23 is disengaged it will move to its uppermost position by reason of its cables 46 and counter weights 47. The upward and downward movements of carriages 23, just described, will continue as long as the feeding of welding electrode 8 continues.

After the first few movements of carriages 23, just mentioned, welding electrode 8 will touch work 3 and the arc control arrangements will so control the rotation of motor 5 to strike and establish the arc of predetermined length. The welding will then proceed in the usual manner. As the top of the first section of welding electrode 8 approaches feeding wheel 6 another section is passed through guides 15 and joined to the top of the first section. This is repeated from time to time as required.

It is to be noted that during the establishment of the arc and the subsequent welding at least one of carriages 23 is at all times engaged with an exposed section of core 16 of welding electrode 8 so that the passage of welding current to core 16 is uninterrupted. It is also to be noted that before either of carriages 23 is disengaged from welding electrode 8 the other carriage 23 is engaged, this minimizes arcing at contact members 34 and prolongs their life.

While I have shown and described contact device 18 as including two carriages 23 it should be obvious that a greater number of such carriages can be used.

I claim:

1. In electric arc welding apparatus a welding electrode, means for feeding said electrode to the arc, welding current supply means, means connectible to said electrode on its way to the arc reciprocatable in the path of said electrode, and means connecting said reciprocatable means to said current supply means.

2. In electric arc welding apparatus a welding electrode, means for feeding said electrode to the arc, welding current supply means, a plurality of means reciprocatable in the path of said electrode, means connecting each of said reciprocatable means to said current supply means, means causing said plurality of reciprocatable means to successively engage said welding electrode, and means causing said reciprocatable means to successively disengage said electrode.

3. In electric arc welding apparatus a welding electrode, means for feeding said electrode to the arc, welding current supply means, a plurality of vertically spaced means each reciprocatable between spaced points in the path of said electrode, means connecting each of said plurality of reciprocatable means to said current supply means, means operable to cause said plurality of reciprocatable means to successively engage said electrode, each means of said plurality of reciprocatable means being in its upper position when it engages said electrode, means operable to cause said plurality of reciprocatable means to successively disengage from said welding electrode, each means of said plurality of reciprocatable means being it its bottom position when it disengages from said electrode, and means constantly urging each of said plurality of reciprocatable means to its top position.

4. In electric arc welding apparatus, a welding electrode, means for feeding said electrode to the arc, welding current supply means, a plurality of vertically spaced means each reciprocatable between spaced points in the path of said electrode, means constantly urging said reciprocatable means to their top positions, means connecting each of said reciprocatable means to said welding current supply means, means operable to cause said plurality of reciprocatable means to successively engage said electrode, each of said reciprocatable means moving to its bottom position with said electrode after engaging said electrode, and means for disengaging each of said reciprocatable means from said electrode as each of said reciprocatable means reaches its bottom position, said operable means being effective to cause a reciprocatable means to engage said electrode before another reciprocatable means is disengaged from said electrode.

5. In electric arc welding apparatus, a welding electrode, means for feeding said electrode to the arc, welding current supply means, a plurality of vertically spaced means each reciprocatable between spaced points in the path of said electrode, means constantly urging said reciprocatable means to their top positions, means connecting each of said reciprocatable means to said welding current supply means, means operable to cause said plurality of reciprocatable means to successively engage said electrode, each of said reciprocatable means moving downwardly with said electrode after engaging said electrode, and means for disengaging said reciprocatable means from said electrode, said disengaging means being effective to disengage a reciprocating means after another reciprocating means has engaged said electrode.

6. In electric arc welding apparatus, a welding electrode including a metallic core and a non-conducting covering therefor broken at regularly spaced intervals to expose small areas of said core, means for feeding said electrode to the arc, welding current supply means, means reciprocatable in the path of said electrode, said reciprocatable means being adapted to engage said electrode to move therewith for a distance at least equal to the distance between adjacent exposed areas of said electrode, means connecting said reciprocatable means to said current supply means, means causing said reciprocatable means to engage said exposed areas as each of said exposed areas enters the path of movement of said reciprocatable means, means causing said reciprocatable means to disengage said exposed areas as each of said exposed areas leaves the path of movement of said reciprocatable means and means effective to return said reciprocatable means after disengagement with said electrode.

7. In electric arc welding apparatus, a welding electrode including a metallic core and a non-conducting covering therefor broken at regularly spaced intervals to expose small areas of said core, means for feeding said electrode to the arc, welding current supply means, a plurality of vertically spaced means each reciprocatable between spaced points in the path of said electrode, means connecting said reciprocatable means to said current supply means; means causing said reciprocatable means to engage said exposed areas as said exposed areas enter the paths of said reciprocatable means, means causing said reciprocatable means to disengage from said exposed areas as said exposed areas leave the paths of said reciprocatable means, and means to return said reciprocatable means to their top position after disengagement, the total movement of said reciprocatable means with said electrode being at least equal to the distance between adjacent exposed areas.

8. In electric arc welding apparatus, a welding electrode including a metallic core and a non-conducting covering therefor broken at regularly spaced intervals to expose small areas of said core, means for feeding said electrode to the arc, welding current supply means, a plurality of vertically spaced means each reciprocatable between spaced points in the path of said electrode, means cooperating with each of said reciprocatable means constantly urging said reciprocatable means to their top position, means connecting said reciprocatable means to said current supply means, means cooperating with said reciprocatable means adapted to cause said reciprocatable means to engage said electrode when exposed areas of said electrode enter the paths of movement of said reciprocatable means whereby each reciprocatable means moves with said electrode as the exposed areas pass between its points of movement, and means adapted to disengage said reciprocatable means from said electrode when exposed areas of said electrode leave the paths of movement of said reciprocatable means, the total travel of said reciprocatable means with said electrode exceeding the distance between adjacent exposed areas by an amount sufficient to assure an overlap between engagement and disengagement of consecutive ones of said reciprocatable means.

9. In electric arc welding apparatus, a welding electrode including a metallic core and a non-conducting covering therefor broken at regularly spaced intervals to expose small areas of said core, means for feeding said electrode to the arc, welding current supply means, a plurality of vertically spaced reciprocatable means, each one of said reciprocatable means having a path of movement between spaced points in the path of said electrode, said paths of movement of said reciprocatable means being of such a length and so spaced that an exposed area of said electrode enters one path and moves through a substantial distance therein prior to the time that the adjacent exposed area leaves another of said paths of movement of said reciprocatable means, means connecting said reciprocatable means to said current supply means, means operable to cause said reciprocatable means to engage said electrode at exposed areas when exposed areas enter said paths of movement of said reciprocatable means, means operable to disengage said reciprocable means from said electrode when the exposed areas leave said paths of movement of said reciprocatable means, and means for returning each of said reciprocatable means to the top of its path of movement after disengagement from said electrode.

10. In electric arc welding apparatus, a welding electrode including a metallic core and a non-conducting covering therefor broken at regularly spaced intervals to expose small areas of said core, means for feeding said electrode to the arc, welding current supply means, a support, a pair of vertically spaced means reciprocatable in said support in the path of said electrode, means connecting each of said vertically spaced means to said current supply means, means on said support limiting the upward movement of each of said vertically spaced means, means effective to cause said vertically spaced means to engage said electrode when an exposed area registers with the top positions thereof, means effective to disengage said vertically spaced means from said electrode when said vertically spaced means reach their bottom positions, means effective to return said vertically spaced means to their top position after disengagement, said upward movement limiting means and said disengagement means being so related that the movement with the electrode of each of said vertically spaced means is less than the distance between adjacent exposed areas of said electrode and the total movement of said pair of vertically spaced means with said electrode is greater than the distance between adjacent exposed areas of said electrode.

11. In electric arc welding apparatus, a welding electrode including a metallic core and non-conducting covering therefor broken at regularly spaced intervals to expose small areas of said core, means for feeding said electrode to the arc, welding current supply means, a support, a pair of vertically spaced means reciprocatable in said support in the path of said electrode, means connecting each of said vertically spaced means to said current supply means, means on said support limiting the upward movement of each of said vertically spaced means, means effective to cause said vertically spaced means to engage said electrode when an exposed area registers with the top positions thereof, means effective to disengage said vertically spaced means from said electrode when said vertically spaced means reach their bottom positions, means effective to return said vertically spaced means to their top position after disengagement, said upward movement limiting means and said disengagement means being so related that an exposed area of said electrode will register with the top position of the bottom one of said vertically spaced means prior to the disengagement of the top one of said vertically spaced means and an exposed area will register with the top position of said top one of said vertically spaced members prior to the disengagement of said bottom one of said vertically spaced means.

12. In electric arc welding apparatus, a welding electrode including a metallic core and a non-conducting covering therefor broken at regularly spaced intervals to expose small areas of said core, means for feeding said electrode to the arc, welding current supply means, a support through which said electrode is adapted to pass, a pair of vertically spaced means reciprocatable in said support in the path of said electrode, means connecting each of said vertically spaced means to said current supply means, means on said support limiting the upward movement of the top one of said vertically spaced means, means on said support limiting the upward movement of the bottom one of said vertically spaced means, means cooperating with said welding electrode effective to cause said vertically spaced means to engage said electrode when exposed areas register with the top portions of said vertically spaced means, means spaced below each of said upward movement limiting means by a distance greater than one half the distance between adjacent exposed areas of said electrode for disengaging said vertically spaced means from said electrode, and means for returning said vertically spaced means to their top positions after disengagement.

13. In electric arc welding apparatus, a welding electrode including a metallic core and a non-conducting covering therefor broken at regularly spaced intervals to expose small areas of said core, means for feeding said electrode to the arc, welding current supply means, a support through which said electrode is adapted to pass, a pair of vertically spaced means reciprocatable in said support in the path of said electrode, means connecting each of said vertically spaced means to said current supply means, means on said support limiting the upward movement of the top one of said vertically spaced means, means on said support limiting the upward movement of the bottom one of said vertically spaced means, a pair of means cooperating with said welding electrode, one of said cooperating means being effective when an exposed area of said electrode registers with it to cause the top one of said vertically spaced means to engage said electrode and the other of said cooperating means being effective when an exposed area registers with it to cause the bottom one of said vertically spaced means to engage said electrode, each of said cooperating means being spaced from its respective one of said vertically spaced means by a distance equal to the distance between adjacent or a plurality of exposed areas of said electrode, means spaced below each of said upward movement limiting means for disengaging said vertically spaced means from said electrode, and means for returning said vertically spaced means to their top positions after disengagement.

14. In electric arc welding apparatus, a welding electrode including a metallic core and a non-conducting covering therefor broken at regularly spaced intervals to expose small areas of said core, means for feeding said electrode to the arc, welding current supply means, a support through which said electrode is adapted to pass, a pair of vertically spaced carriages each movable in said support between spaced points in the path of the electrode, a pair of opposed actuable levers supported in each of said carriages, means constantly urging said levers away from each other, a contact piece mounted on each of said levers to engage said electrode when said levers are moved toward each other, means connecting the contact pieces to said current supply means, means operable to cause the levers of said pairs of levers to move towards each other mounted on each of said carriages, locking means for locking each of said pairs of levers in the engagement position, means carried by said support for limiting the upward movement of each of said carriages, means also carried by said support for unlocking said pairs of levers when their respective carriages reach their bottom positions, means for returning each of said carriages to its top position, said upward movement limiting means and said unlocking means being so related that the movement of each of said carriages with said electrode is less than the distance which separates adjacent exposed areas of said electrode and the total movement of said carriages with said electrode is greater than the distance which separates adjacent exposed areas of said electrode, and means cooperating with said electrode adapted to cause said means operable to cause the levers to move towards each other to operate when an exposed area registers with the top position of the contact pieces of each of said carriages.

15. In electric arc welding apparatus, a welding electrode including a metallic core and a non-conducting covering therefor broken at regularly spaced intervals to expose small areas of said core, means for feeding said electrode to the arc, a welding current supply means, a support through which said electrode is adapted to pass, a pair of vertically spaced carriages each movable in said support between spaced points in the path of said electrode each of said carriages having pivoted thereto a pair of opposed actuable levers, one of said levers being located on one side and the other being located on the other side of the path of said electrode, means normally separating said levers, a contact piece carried by each of said levers adapted to engage said electrode, means connecting said contact pieces to said current supply means, means carried by each of said carriages operable to move its pair of levers towards each other to engage its contact pieces with said electrode, said means last mentioned including a solenoid having an electrical circuit which includes a normally open switch, locking means carried by each of said carriages operable when its pairs of levers are in engagement position to lock said levers against separating movement, means on said support limiting the upward movement of each of said carriages, means carried by said support adapted to release said locking means to allow said contact pieces to disengage said electrode positioned below said upward movement limiting means, means for returning each of said carriages to its top position after disengagement, and means cooperating with said electrode adapted to close the switch of one of said solenoids when an exposed area of said electrode registers with the top position of the contact pieces of its carriage and adapted to close the switch of the other solenoid when an exposed area of said electrode registers with the top position of the contact pieces of the other carriage.

16. In electric arc welding apparatus, a welding electrode including a metallic core and a non-conducting covering therefor broken at regularly spaced intervals to expose small areas of said core, means for feeding said electrode to the arc, welding current supply means, a support through which said electrode is adapted to pass, a pair of vertically spaced carriages each movable in said support between spaced points in the path of said electrode, means on said support limiting the upward movement of each of said carriages, means carried by said support limiting the downward movement of said carriages, means constantly urging said carriages to their top positions, each of said carriages having pivoted thereto a pair of levers, contact pieces on each of said levers adapted to engage said electrode when said levers are brought toward each other, means normally urging said levers away from each other, means connecting said contact pieces to said current supply means, means on each of said carriages adapted to move said levers to engagement positions, means for locking said levers in engagement position, each of said levers moving means including a solenoid having an energizing circuit, a normally open switch in each of said circuits, and a pair of movable means mounted on said support to constantly bear on said electrode, one of said movable means being located one or more multiples of the distance between adjacent exposed areas from the top position of the contact pieces of one of said carriages and the other of said movable means being located at a like distance from the top position of the contact pieces of the other of said carriages, said one movable means being adapted to close, when it registers with an exposed area, the switch of said one carriage and said other movable means being adapted to close, when it registers with an exposed area, the switch of said other of said carriages, said downward movement limiting means including means for opening said lever locking means.

ROBERT K. HOPKINS.